(12) United States Patent
Novotny

(10) Patent No.: US 8,522,447 B1
(45) Date of Patent: Sep. 3, 2013

(54) LOCATING SYSTEMS

(76) Inventor: Joshua James Novotny, El Cajon, CA (US)

( * ) Notice: Subject to any disclaimer, the term of this patent is extended or adjusted under 35 U.S.C. 154(b) by 292 days.

(21) Appl. No.: 13/106,109

(22) Filed: May 12, 2011

Related U.S. Application Data

(60) Provisional application No. 61/348,207, filed on May 25, 2010.

(51) Int. Cl.
*G01B 3/10* (2006.01)
*G01B 5/25* (2006.01)

(52) U.S. Cl.
USPC .................................. 33/770; 33/485; 33/645

(58) Field of Classification Search
USPC .................. 33/286, 484, 485, 613, 645, 760, 33/768, 770, DIG. 21, 486
See application file for complete search history.

(56) References Cited

U.S. PATENT DOCUMENTS

| | | | |
|---|---|---|---|
| 5,075,977 A | 12/1991 | Rando | |
| 5,083,380 A * | 1/1992 | Robertson | ........................ 33/485 |
| 5,713,135 A | 2/1998 | Acopulos | |
| 5,894,675 A | 4/1999 | Cericola | |
| 6,209,219 B1 | 4/2001 | Wakefield et al. | |
| 6,223,446 B1 | 5/2001 | Potter | |
| 6,240,649 B1 * | 6/2001 | McElroy | .................. 33/DIG. 21 |
| 6,453,568 B1 | 9/2002 | Hymer | |
| 6,463,666 B1 * | 10/2002 | Szumer | ........................... 33/484 |
| 6,640,456 B2 | 11/2003 | Owac et al. | |
| 6,973,733 B2 * | 12/2005 | Levine | ............................. 33/484 |
| 7,137,209 B2 | 11/2006 | Northern et al. | |
| 7,254,899 B2 | 8/2007 | Marocco et al. | |
| 7,430,810 B2 | 10/2008 | Sergyeyenko et al. | |
| 7,497,018 B2 | 3/2009 | Hersey et al. | |
| 2003/0218469 A1 | 11/2003 | Brazell et al. | |
| 2005/0034320 A1 | 2/2005 | Connor | |
| 2005/0246917 A1 | 11/2005 | Webb et al. | |
| 2006/0236555 A1 * | 10/2006 | Sullivan | ........................... 33/770 |
| 2007/0079516 A1 | 4/2007 | Eckstein et al. | |
| 2012/0073155 A1 * | 3/2012 | Mabey | ............................. 33/770 |

* cited by examiner

*Primary Examiner* — Brad Bennett
(74) *Attorney, Agent, or Firm* — Stoneman Law Patent Group; Martin L. Stoneman

(57) ABSTRACT

A system for slidably attaching a laser device to a tape measure ruler to use in lieu of a plumb bob to assist locating points on remote surfaces. The device is easily portable and connectable to most any tape measure. The device is particularly useful for finding points on arched or curved surface out of the normal reach of just a tape measure alone. The locating system preferably comprising a portable device having at least one laser pointer in combination with at least one leveling device slidably attachable to a tape measure tape.

20 Claims, 5 Drawing Sheets

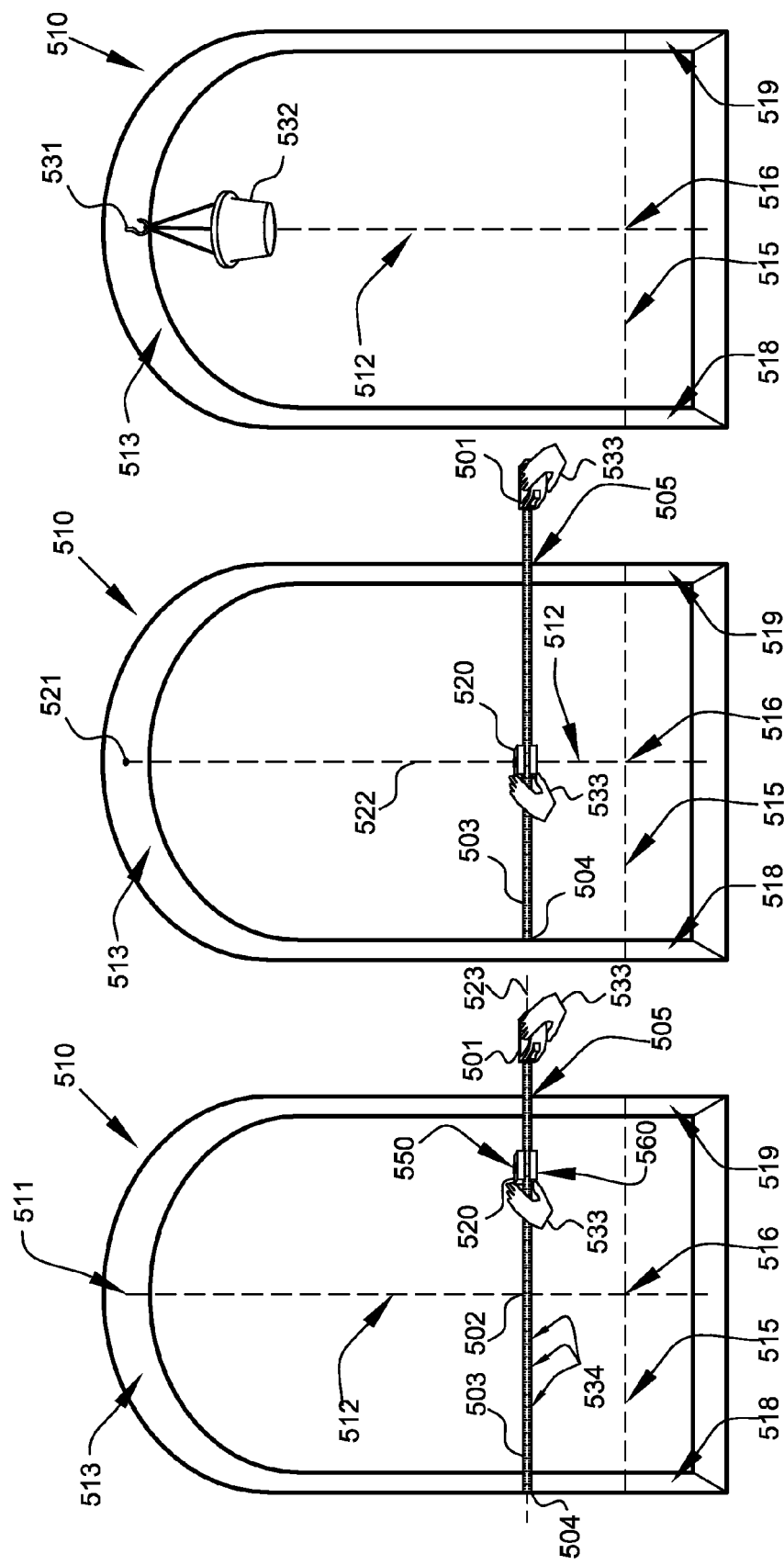

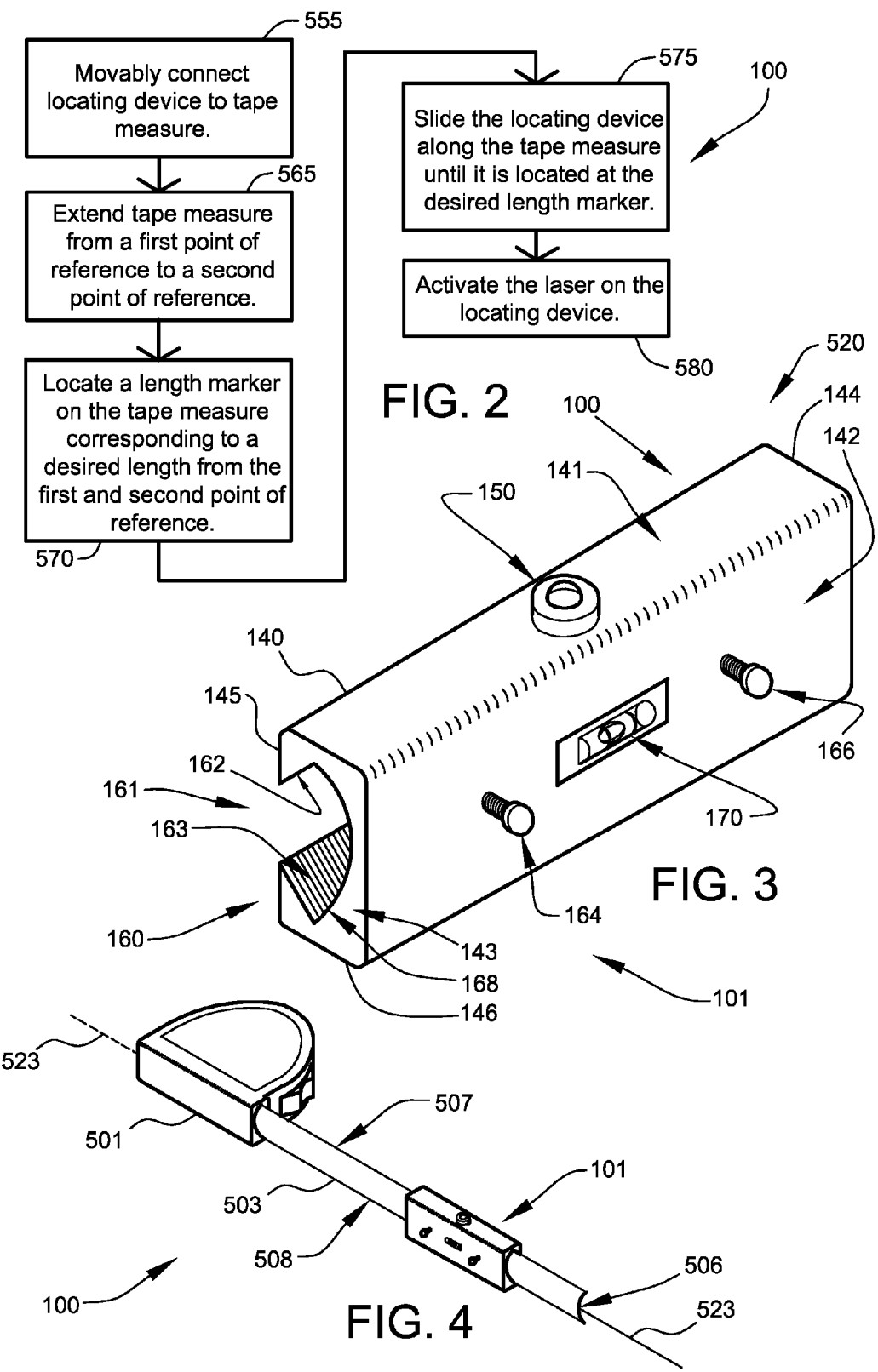

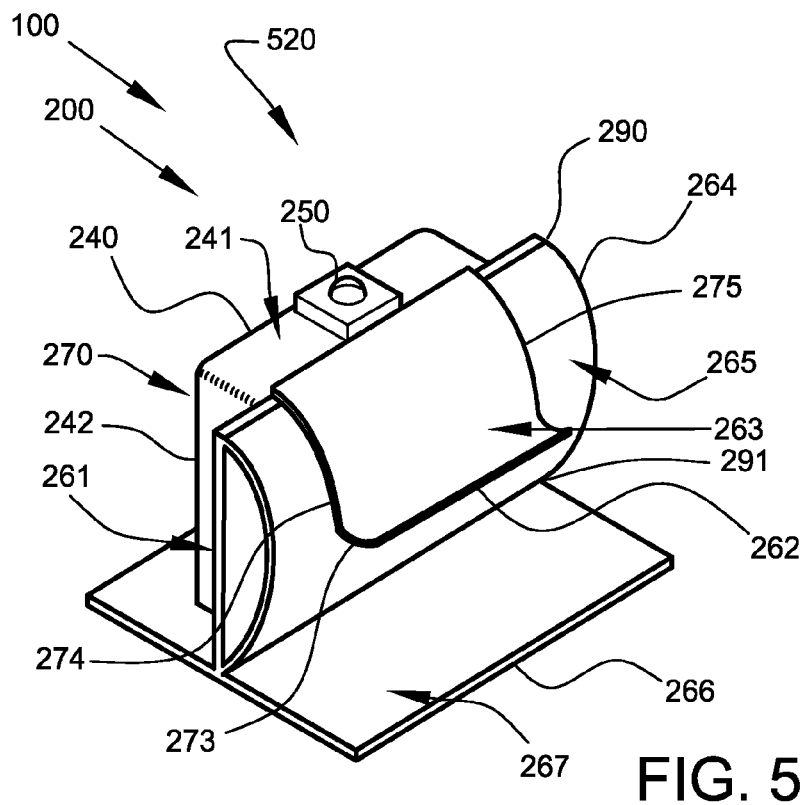
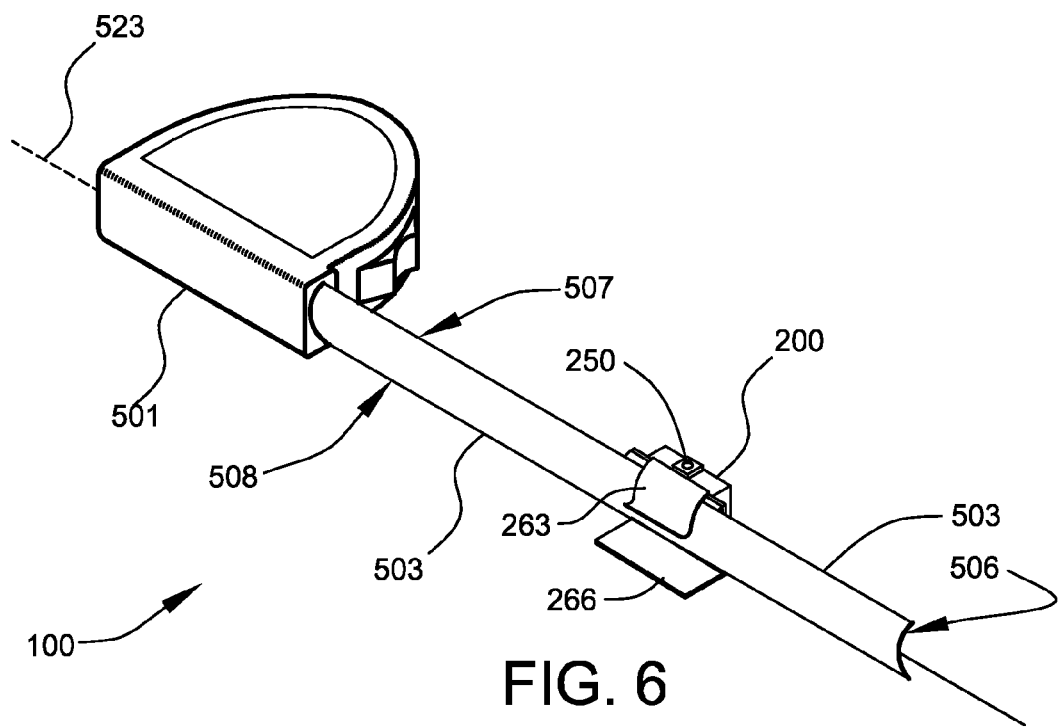

LOCATING SYSTEMS

CROSS-REFERENCE TO RELATED APPLICATION

The present application is related to and claims priority from prior provisional application Ser. No. 61/348,207, filed May 25, 2010, entitled "LOCATING SYSTEMS", the contents of all of which are incorporated herein by this reference and are not admitted to be prior art with respect to the present invention by the mention in this cross-reference section.

BACKGROUND

This invention relates to providing a system of laser-attached locating devices. More particularly, this invention relates to providing a system for movably attaching at least one laser device to a coiled rule assembly and locating points on remote surfaces.

There is sometimes a need to locate a point on a remote surface that is directly above at least one point measured along an imaginary line between at least two visible points of reference. It may present a problem to suspend light fixtures, hanging plants, holiday décor such as mistletoe, etc., from surfaces directly above measured intervals along an imaginary line between two visible points of reference. The problem is even greater when the point to be located lies upon a remote surface with curvature, such as an arch or dome. Multiple measurements may even be required when attempting to solve this problem. A need exists for a system of locating such remote points with a single measurement, while maintaining accuracy. And, as advances in technology have greatly increased the number of "gadgets" taking up the limited space in the typical toolbox, there is a need for a system that solves this problem which is small, portable and capable of use with existing tools.

OBJECTS AND FEATURES OF THE INVENTION

A primary object and feature of the present invention is to provide a system overcoming the above-mentioned problem(s).

It is a further object and feature of the present invention to provide a system of locating points on remote surfaces with a single measurement, while maintaining accuracy.

It is a further object and feature of the present invention to provide a system comprising a portable device having at least one laser pointer in combination with at least one leveling device slidably attachable to a tape measure tape.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a portable locating system comprising: at least one vertical beam projector structured and arranged to project at least one vertical beam comprising parallel light rays; at least one housing structured and arranged to house such at least one vertical-beam projector; and at least one attacher structured and arranged to removably attach such at least one housing to at least one ruled measure; wherein when such at least one vertical beam projector is attached to such at least one ruled measure and such at least one ruled measure is in a substantially horizontal position, such at least one vertical beam may be projected vertically. Moreover, it provides such a portable locating system wherein: such at least one housing comprises at least one horizontal groove and at least one flange on at least one side of such at least one horizontal groove; and such at least one attacher comprises such at least one horizontal groove and such at least one flange on such at least one side of such at least one horizontal groove. Additionally, it provides such a portable locating system wherein such at least one attacher comprises at least one grip to grip the at least one ruled measure. Also, it provides such a portable locating system wherein such at least one grip comprises at least one clip. In addition, it provides such a portable locating system wherein: such at least one housing, comprises at least one slit structured and arranged to grip the at least one ruled measure; and such at least one attacher comprises such at least one slit.

And, it provides such a portable locating system wherein: such at least one housing comprises at least one first structure, at least one second structure, and at least one horizontal axis of rotation between such at least one first structure and such at least one second structure; such at least one attacher comprises at least one concave surface of such at least one first structure, and at least one convex surface of such at least one second structure; and when such at least one concave surface is rotated to be adjacent to such at least one convex surface at least one grip, structured and arranged to grip the at least one ruled measure, is formed. Further, it provides such a portable locating system wherein such at least one convex surface of at least one such second structure comprises at least one alignment window structured and arranged to permit user viewing of such at least one ruled measure. Even further, it provides such a portable locating system wherein such at least one housing comprises at least one leveler structured and arranged to assist user-leveling of such at least one housing.

In accordance with another preferred embodiment hereof, this invention provides a method, relating to locating at least one remote point on at least one structure, comprising the steps of: movably connecting at least one focused light beam locating device to exactly one rule measuring device comprising exactly one flexible ruled portion; locating such rule measuring device at a first visible point of reference; extending the flexible ruled portion of such rule measuring device until its leading edge physically contacts at least one second visible point of reference; locating on the flexible ruled portion at least one user-selected length marker; sliding such focused light beam locating device along the flexible ruled portion until it is located at such user-selected length marker; and activating such focused light beam locating device to emit at least one focused light beam in a direction perpendicular to such flexible ruled portion; wherein user-noting of at least one intersection of such at least one focused light beam and the at least one structure assists such user in locating at least one remote point on the at least one structure.

In accordance with another preferred embodiment hereof, this invention provides a portable locating system comprising: at least one projector structured and arranged to project at least one virtual plumb line; wherein such at least one projector is releasably connectable to at least one linear measuring instrument; and wherein a user is enabled to project such virtual plumb line at a user-selected location along such at least one linear measuring instrument. Moreover, it provides such a portable locating system: wherein such at least one projector comprises at least one horizontal groove and at least one flange on at least one side of such at least one horizontal groove; wherein such at least one horizontal groove and such at least one flange are structured and arranged to releasably connect to such at least one linear measuring instrument.

Additionally, it provides such a portable locating system wherein such at least one projector comprises at least one gripper to grip the at least one linear measuring instrument.

Also, it provides such a portable locating system wherein such at least one gripper comprises at least one clip. In addition, it provides such a portable locating system wherein such at least one projector comprises at least one slit structured and arranged to grip the at least one linear measuring instrument. And, it provides such a portable locating system wherein: such at least one housing comprises at least one first structure, at least one second structure, and at least one horizontal axis of rotation between such at least one first structure and such at least one second structure; such at least one attacher comprises at least one concave surface of such at least one first structure, and at least one convex surface of such at least one second structure; and when such at least one concave surface is rotated to be adjacent to such at least one convex surface at least one grip, structured and arranged to grip the at least one linear measuring instrument, is formed. Further, it provides such a portable locating system wherein such at least one convex surface of such at least one second structure comprises at least one alignment window structured and arranged to permit user-viewing of the at least one linear measuring instrument. Even further, it provides such a portable locating system wherein such at least one housing comprises at least one leveler structured and arranged to assist in leveling such at least one housing.

In accordance with another preferred embodiment hereof, this invention provides a portable locating system comprising: at least one housing releasably attachable to a tape measure; leveling means for assisting keeping such at least one housing level to the ground; and, locating means for projecting an image identifying the intersection of an axis perpendicular to the ground.

In accordance with another preferred embodiment hereof, this invention provides a portable locating system comprising: projector means for projecting at least one image; and housing means for housing such projector means; wherein such housing means comprises gripping means for releasably gripping at least one linear measurer.

In accordance with another preferred embodiment hereof, this invention provides a portable locating system comprising: at least one projector structured and arranged to project at least one image; and at least one housing structured and arranged to house such at least one projector; wherein such at least one housing comprises at least one gripper structured and arranged to releasably grip at least one linear measurer; and wherein such at least one housing, such at least one gripper and such at least one projector comprise at least one geometry structured and arranged so that such at least one projector projects perpendicular to at least one line of measure of such at least one linear measurer.

In accordance with another preferred embodiment hereof, this invention provides a portable locating system comprising: vertical-beam projector means for projecting at least one vertical-beam comprising parallel light rays; housing means for housing such vertical beam projector means; and at least one attacher means for removably attaching such housing to at least one ruled measure; wherein, when such beam projector means is attached to the at least one ruled measure and the at least one ruled measure is in a substantially horizontal position, the at least one beam may be projected vertically.

In accordance with another preferred embodiment hereof, this invention provides each and every novel feature, element, combination, step and/or method disclosed or suggested by this patent application.

BRIEF DESCRIPTION OF THE DRAWINGS

FIG. 1A shows a perspective view, illustrating a step in a method of locating the center of an arch using a locating device of a locating system, according to a preferred embodiment of the present invention.

FIG. 1B shows a perspective view, illustrating another step in the method of locating the center of an arch using a locating device, according to the preferred embodiment of FIG. 1A FIG. 1C shows a perspective view, illustrating another step in the method of locating the center of an arch using a locating device, according to the preferred embodiment of FIG. 1A.

FIG. 2 shows a flow chart, showing a method of locating a remote point using a locating device of the locating system, according to a preferred embodiment of the present invention.

FIG. 3 shows an isometric view of a flanged box device, illustrating a preferred embodiment of the locating device of the locating system, according to a preferred embodiment of the present invention.

FIG. 4 shows a perspective view, illustrating a method of connecting the flanged box device to a ruled tape, according to the preferred embodiment of FIG. 3.

FIG. 5 shows an isometric view of a clip attachment device, illustrating a locating device of the locating system, according to another preferred embodiment of the present invention.

FIG. 6 shows a perspective view of the clip attachment device attached to ruled tape, illustrating connection of the clip attachment device to ruled tape, according to the preferred embodiment of FIG. 5.

Figure 7:
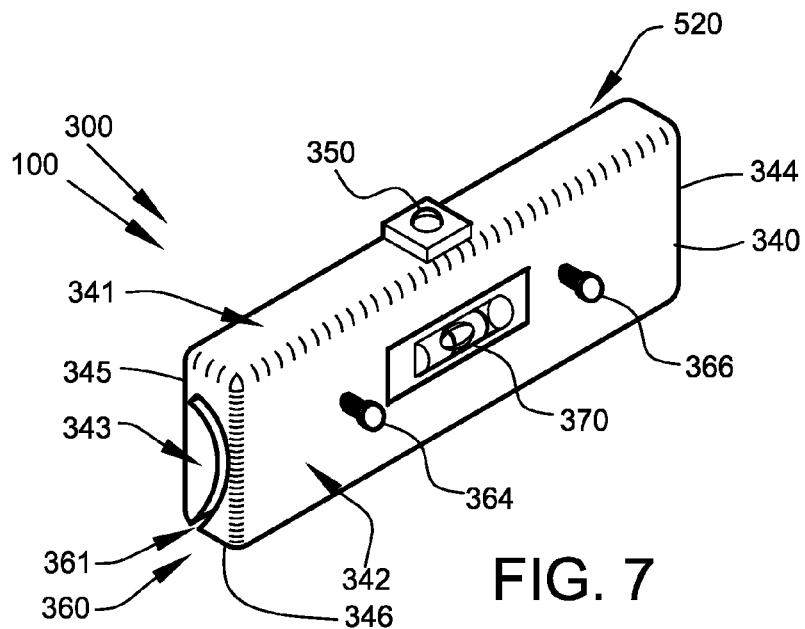
FIG. 7 shows an isometric view of a slit cut attachment device of the locating system, illustrating the locating device, according to another preferred embodiment of the present invention.

DETAILED DESCRIPTION OF THE BEST MODES AND PREFERRED EMBODIMENTS OF THE INVENTION

FIG. 1A shows a perspective view, illustrating a step in a method of locating the center of an arch using locating device 520 of locating system 100, according to a preferred embodiment of the present invention. FIG. 1B shows a perspective view, illustrating another step in the method of locating the center of an arch using locating device 520, according to the preferred embodiment of FIG. 1A. FIG. 1C shows a perspective view, illustrating another step in the method of locating the center of an arch using locating device 520, according to the preferred embodiment of FIG. 1A.

FIG. 1A, FIG. 1B and FIG. 1C show perspective views, illustrating preferred steps in a method of locating the center of an arch using locating device 520 of locating system 100, according to a preferred embodiment of the present invention.

Applicant's preferred locating device 520 preferably comprises at least one housing 140 (see FIG. 3), preferably at least one focused light source comprising preferably at least one laser 550 (laser 150 on FIG. 3 for clarity), preferably at least one attachment mechanism 560, and preferably at least one leveling device 170 (see FIG. 3), as best shown in FIG. 3.

Locating device 520 preferably is releasably and movably connected to preferably exactly one measuring device, more preferably a coil-storable rule assembly, more preferably measuring device 501, by means of at least one attachment mechanism 560 (as disclosed herein according to preferred embodiments of the present invention, attachment mechanism preferably may comprise slit-cut attachment, clip attachment and open box attachment), as shown in FIG. 1A (this arrangement at least herein embodies wherein such at least one projector is releasably connectable to at least one linear measuring instrument). When movably connected to ruled tape 503 of measuring device 501, attachment mechanism 560 preferably constrains ruled tape 503 from all rotational movement relative to attachment mechanism 560 and preferably only permits translational movement relative to attachment mechanism 560 along a single axis of movement 523 (this arrangement at least herein embodies at least one attacher structured and arranged to removably attach such at least one housing to at least one ruled measure). Measuring device 501 preferably comprises at least one ruled tape 503 and preferably exactly one leading edge 504. Ruled tape 503 preferably comprises a convex surface, preferably curvature 506 (see FIG. 4), and preferably at least one plurality of ruled markings 534 preferably along the entire length of ruled tape 503. Ruled markings 534 preferably identify the measured length, preferably as measured from leading edge 504, to each respective ruled marking 534, as shown.

Attachment mechanism 560 (at least embodying herein at least one attacher means for removably attaching such housing to at least one ruled measure) preferably is rigidly connected with housing 140. Housing 140 preferably is rigidly connected to laser 550, as shown. Housing 540 preferably serves as a rigid connection between laser 550 (at least embodying herein vertical-beam projector means for projecting at least one vertical-beam comprising parallel light rays) and attachment mechanism 560. Upon reading this specification, those with ordinary skill in the art will now appreciate that, under appropriate circumstances, considering such issues as design preference, user preferences, marketing preferences, cost, structural requirements, available materials, technological advances, etc., other attachment arrangements such as, for example, elastic attachment, flexible attachment, semi-rigid attachment, etc., may suffice.

Laser 550 preferably is rigidly connected to housing 140 (at least embodying herein housing means for housing such vertical-beam projector means) in exactly one orientation perpendicular to axis of movement 523. Leveling device 170 (see FIG. 3) preferably is oriented to keep axis of movement 523 level with the horizon (this arrangement at least embodies herein wherein, when such at least one vertical beam projector is attached to the at least one ruled measure and such at least one ruled measure is in a substantially horizontal position, such at least one vertical beam may be projected vertically; and, this arrangement at least herein embodies wherein, when such vertical-beam projector means is attached to the at least one ruled measure and the at least one ruled measure is in a substantially horizontal position, the at least one beam may be projected vertically). Leveling device 170 (at least herein embodying wherein such at least one housing comprises at least one leveler structured and arranged to assist user-leveling of such at least one housing) is preferably rigidly connected to housing 140 (as shown in FIG. 3).

Locating device 520 preferably is used to locate at least one remote point 511 on at least one ceiling surface 513 of at least one covered structure 510 relative to visible point of reference 518 and visible point of reference 519, as shown. Covered structure 510 may be any structure possessing a ceiling surface 513, such as a doorway, window, interior room, hallway, etc. Visible point of reference 518 and visible point of reference 519 are selected by at least one user 533 (illustrated by a hand) and comprise any user 533 desired point of reference, including structural elements such as window frames, door frames, walls, columns, windows, doors, etc. Visible point of reference 518 is imaginarily connected to visible point of reference 519 by horizontal imaginary line 515.

Remote point 511 is located relative to visible point of reference 518 and visible point of reference 519 preferably by exactly one straight vertical imaginary line 512 that is perpendicular to horizontal imaginary line 515 and intersects horizontal imaginary line 515 at exactly one user-selected point 516. User-selected point 516 preferably comprises at least one point along horizontal imaginary line 515 located at exactly one user-specified distance from visible point of reference 518 and at exactly one user specified distance from visible point of reference 519.

A preferred method of use of locating device 520 preferably comprises the steps of: movably connecting locating device 520 to measuring device 501 by means of attachment mechanism 560 (as shown in FIG. 1A); extending ruled tape 503 of measuring device 501 such that exactly one leading edge 504 of measuring device 501 physically contacts visible point of reference 518 and at least one measurement point 505 of ruled tape 503 physically contacts visible point of reference 519 while simultaneously keeping ruled tape 503 taut (as shown in FIG. 1A); locating on ruled tape 503 at least one measured point 502 marked with a distance equal to the distance from user-selected point 516 to visible point of reference 519 (as shown in FIG. 1A); sliding locating device 520 along ruled tape 503 until it is located at measured point 502 (as shown in FIG. 1B) (at least herein embodying wherein a user is enabled to project such virtual plumb line at a user-selected location along such at least one linear measuring instrument); activating laser 550 to emit at least one focused light beam which comprises a "virtual plumb line" 522, and which strikes ceiling surface 513 creating image 521 upon ceiling surface 513 (as shown in FIG. 1B). The above arrangement at least embodies herein at least one projector structured and arranged to project at least one virtual plumb line; and the above arrangement at least embodies herein at least one projector structured and arranged to project at least one image; and the above arrangement at least herein embodies wherein such at least one housing, such at least one gripper and such at least one projector comprise at least one geometry structured and arranged so that such at least one projector projects perpendicular to at least one line of measure of such at least one linear measurer.

Measured point 502, "virtual plumb line" 522 and image 521 are all co-linear with straight vertical imaginary line 512. Moreover, image 521 is located at remote point 511 thus visibly marking the location of remote point 511. User 533 of locating device 520 may use image 521 to mark the point of attachment 531 of any object that user 533 wishes to suspend from remote point 511 of ceiling surface 513. For example, user 533 may suspend an object such as mistletoe, a light fixture, or flower pot 532 from attachment 531, and flower pot 532 is in such manner suspended from remote point 511, as shown in FIG. 1C.

FIG. 2 shows a flow chart, showing the method of locating a remote point 511 using locating device 520 of locating system 100, according to a preferred embodiment of the present invention. In a preferred method of locating a remote point using locating device 520, the first step 555 preferably is to movably connect locating device to the tape measure. The next step 565 preferably is to extend the tape measure from a first point of reference to a second point of reference. The next step 570 preferably is to locate a length marker on the tape measure corresponding to a desired length from the first and second point of reference. The next step 575 preferably is to slide the locating device along the tape measure until it is located at the desired length marker. The next step 580 preferably is to activate the laser on the locating device such that it now points a laser light to the direction above or below to mark as desired by the user. Finally, the user preferably notes the location of the marked point. The above-described method in combination with the drawings at least embodies herein a method, relating to locating at least one remote point on at least one structure, comprising the steps of: movably connecting at least one focused light beam locating device to exactly one rule measuring device comprising exactly one flexible ruled portion; locating such rule measuring device at a first visible point of reference; extending the flexible ruled portion of such rule measuring device until its leading edge physically contacts at least one second visible point of reference; locating on the flexible ruled portion at least one user-selected length marker; sliding such focused light beam locating device along the flexible ruled portion until it is located at such user-selected length marker; and activating such focused light beam locating device to emit at least one focused light beam in a direction perpendicular to such flexible ruled portion; wherein user-noting of at least one intersection of such at least one focused light beam and the at least one structure assists such user in locating at least one remote point on the at least one structure.

FIG. 3 shows an isometric view of flanged box device 101, illustrating a preferred embodiment of locating device 520 of locating system 100, according to a preferred embodiment of the present invention. Flanged box device 101 preferably comprises at least one housing 140, preferably at least one laser 150, preferably at least one flanged attachment mechanism 160, and preferably at least one leveling device 170, as shown. Housing 140 preferably comprises the shape of a rectangular parallelepiped, as shown, preferably comprising at least one rectangular top side 141, preferably at least one rectangular front side 142, preferably at least one rectangular left side 143, preferably at least one rectangular right side 144, preferably at least one rectangular back side 145 and preferably at least one rectangular bottom side 146, as shown. Upon reading this specification, those with ordinary skill in the art will now appreciate that, under appropriate circumstances, considering such issues as design preference, user preferences, cost, structural requirements, available materials, etc., other housing shape arrangement such as, for example, spherical, rounded, cubed, etc., may suffice.

Housing 140 preferably comprises injection molded plastic. Upon reading this specification, those with ordinary skill in the art will now appreciate that, under appropriate circumstances, considering such issues as change in cost of materials, development of new materials, design preference, user preference, technological advances, development of new projectors, etc., other housing materials, such as metal, spring steel, epoxy resins, fiberglass, aluminum, hard rubbers, etc., may suffice.

Flanged attachment mechanism 160 preferably comprises exactly one groove 161, located on back side 145, and preferably two thumb screws 164 and 166, as shown (this arrangement at least herein embodying wherein such at least one projector comprises at least one horizontal groove and at least one flange on at least one side of such at least one horizontal groove). Flanged attachment mechanism 160 preferably enables removable connection of locating device 520 to ruled tape 503 (this arrangement at least herein embodying wherein such at least one horizontal groove and such at least one flange are structured and arranged to releasably connect to such at least one linear measuring instrument).

Groove 161 preferably extends longitudinally across back side 145 and extends through both left side 143 and right side 144, as shown. Groove 161 preferably comprises exactly one concave inner surface 168, preferably at least one upper flange 162 and preferably at least one lower flange 163 (at least herein embodying wherein such at least one attacher comprises such at least one horizontal groove and at least one flange on at least one side of such at least one horizontal groove), as shown. Concave inner surface 168 preferably comprises exactly one curvature, as shown. Preferably, the curvature of concave inner surface 168 is about equal to the curvature of ruled tape 503 (see FIG. 4). Thumb screws 164 and 166 preferably are threaded such that each clockwise turn of screws 164 and 166 advances their tips and further into groove 161. Concave inner surface 168 and screw tips preferably cooperatively act together to grip ruled tape 503 when locating device 520 is connected to ruled tape 503. The above arrangement at least herein embodies wherein such at least one housing comprises at least one gripper structured and arranged to releasably grip at least one linear measurer; and the above arrangement at least herein embodies wherein such at least one projector comprises at least one gripper to grip the at least one linear measuring instrument.

FIG. 4 shows a perspective view, illustrating a method of connecting flanged box device 101 to ruled tape 503, according to the preferred embodiment of FIG. 3. The preferred mode of movably connecting flanged box device 101 to ruled tape 503 preferably comprises the steps of: inserting ruled tape 503 into groove 161 of flanged box device 101 such that the convex surface of ruled tape 503 is flush against concave inner surface 168; rotating thumb screws 164 and 166 clockwise until upper edge 507 of ruled tape 503 is gently pressed against upper flange 162 and lower edge 508 is gently pressed against lower flange 163. When movably connected to ruled tape 503 of measuring device 501, flanged attachment mechanism 160 preferably constrains ruled tape 503 from all rotational movement relative to flanged attachment mechanism 160 and preferably only permits translational movement relative to flanged attachment mechanism 160 along a single axis of movement 523, as shown (this arrangement at least embodies herein when such at least one concave surface is rotated to be adjacent to such at least one convex surface, at least one grip, structured and arranged to grip the at least one linear measuring instrument, is formed). Upon reading this specification, those with ordinary skill in the art will now appreciate that, under appropriate circumstances, considering such issues as design preference, user preferences, marketing preferences, cost, structural requirements, available materials, technological advances, etc., other methods and arrangements of movably connecting flanged box device 101 to ruled tape 503 such as, for example, spring tensioning, friction tensioning, etc., may suffice.

FIG. 5 shows an isometric view of clip attachment device 200, illustrating locating device 520 of locating system 100, according to another preferred embodiment of the present invention. Clip attachment device 200 preferably comprises at least one housing 240, preferably at least one focused light source 250 (preferably comprising a laser), preferably at least one clip attachment mechanism, and preferably at least one leveling device 270 (not visible on view—preferably a bubble level as shown in FIG. 3).

Housing 240 preferably comprises a square housing, preferably comprising the elements shown in FIG. 3, including at least one focused light source 250 and at least one leveling device 270, as shown. Housing 240 preferably comprises injection molded plastic. Upon reading this specification, those with ordinary skill in the art will now appreciate that, under appropriate circumstances, considering such issues as change in cost of materials, development of new materials, design preference, user preference, technological advances, development of new projectors, etc., other housing materials, such as metal, spring steel, epoxy resins, fiberglass, aluminum, hard rubbers, etc., may suffice.

Focused light source 250 preferably is located on the top side 241 of housing 240, as shown. Leveling device 270 preferably is located on the front side 242 of housing 240. Housing 240 preferably is permanently rigidly connected to clip attachment mechanism.

Clip attachment mechanism 260 preferably is constructed of spring steel and preferably comprises at least one squaring member 266, preferably at least one vertical support member 261, preferably at least one convex member 264 and preferably at least one clip 262, as shown. Squaring member 266 preferably is substantially rectangular in shape and comprises preferably at least one top surface 267, as shown. Vertical support member 261 preferably is substantially rectangular in shape and preferably comprises an upper longitudinal edge and preferably a lower longitudinal edge. Convex member 264 preferably is constructed from a rectangular piece of spring steel that is bent and heat treated to imbue it with a permanent curvature substantially equal to the curvature 506 of ruled tape 503, as shown (see FIG. 6). Convex member 264 preferably comprises at least one outer surface 265, preferably at least one upper longitudinal edge 290 and preferably at least one lower longitudinal edge 291, as shown. Clip 262 preferably comprises at least one outer surface 263, preferably at least one inner surface, preferably at least two transverse edges and, and preferably at least two longitudinal edges, as shown. Clip 262 is preferably constructed from a rectangular piece of spring steel that is bent to impart a curvature substantially equal to the curvature 506 of ruled tape 503 (see FIG. 6). Longitudinal edge of clip 262 preferably is flared with an opposing curvature to assist gripping of the housing 240 to ruled tape 503 by clip 262 (this arrangement at least embodies herein wherein the at least one grip comprises at least one clip).

Vertical support member 261 preferably is rigidly affixed in a perpendicular orientation to the top surface 267 of squaring member 266, as shown. Vertical support member 261 preferably is affixed to top surface 267 in a manner substantially bisecting top surface 267, as shown. Convex member 264 preferably is affixed to vertical support member 261 along the longitudinal edges of vertical support member 261, as shown. Preferably, convex member 264 is oriented such that its outer surface 265 faces away from vertical support member 261, as shown. Clip 262 preferably is attached to vertical support member 261 along longitudinal edge 290, as shown. Clip 262 preferably is unrestrained along flared longitudinal edge 273 and transverse edges 274 and 275, thereby allowing for the insertion of ruled tape 503 between the inner surface of clip 262 and the outer surface 265 of convex member 264.

FIG. 6 shows a perspective view of clip attachment device 200 attached to ruled tape 503, illustrating the system of connecting clip attachment device 200 to ruled tape 503, according to the preferred embodiment of FIG. 5. The preferred mode of movably connecting clip attachment device 200 to ruled tape 503 preferably comprises the step of inserting ruled tape 503 between the inner surface of clip 262 and the outer surface 265 of convex member 264, such that curvature 506 of ruled tape 503 is aligned with the curvature of convex member 264, as shown.

Figure 8:
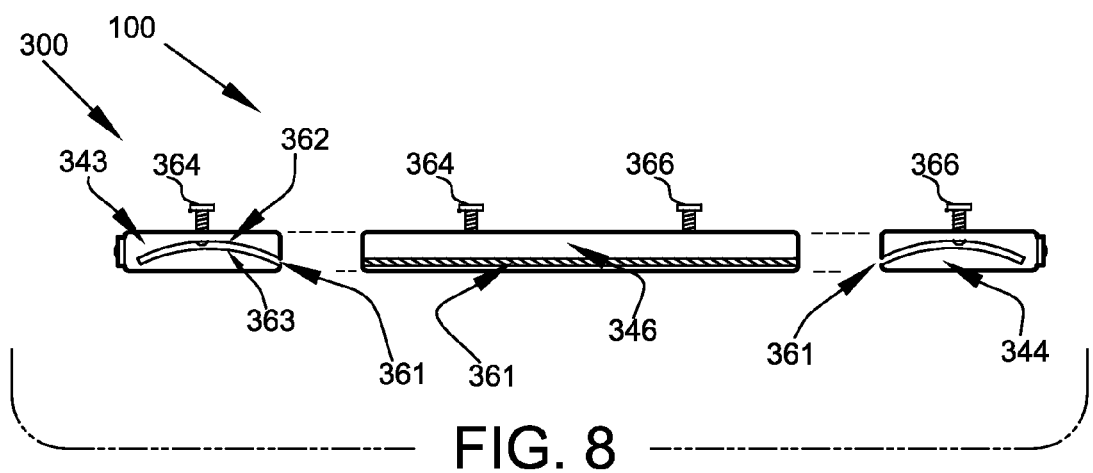
FIG. 8 shows side and bottom views of the slit cut attachment device, according to the preferred embodiment of FIG. 7.
Figure 9:
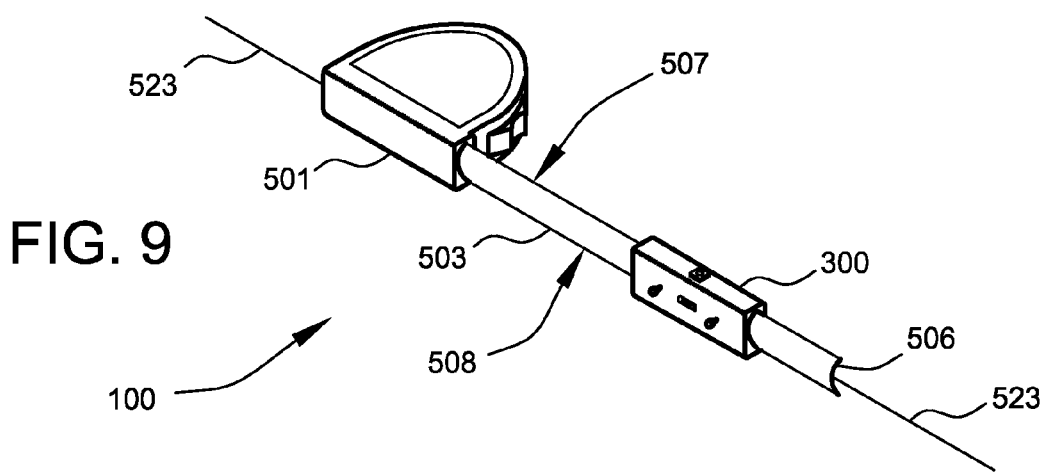
FIG. 9 shows a perspective view, illustrating the preferred connection of the slit cut attachment device to a ruled tape, according to the preferred embodiment of FIG. 7.

FIG. 7 shows an isometric view of slit cut attachment device 300 of locating system 100, illustrating locating device 520, according to another preferred embodiment of the present invention. FIG. 8 shows side and bottom views of slit cut attachment device 300, according to the preferred embodiment of FIG. 7. FIG. 9 shows a perspective view, illustrating the preferred connection of slit cut attachment device 300 to ruled tape 503, according to the preferred embodiment of FIG. 7.

Slit cut attachment device 300 preferably comprises at least one housing 340, preferably at least one focused light source 350 (preferably a laser), preferably at least one slit cut attachment mechanism 360, and preferably at least one leveling device 370, as shown. Housing 340 preferably comprises at least one top side 341, preferably at least one front side 342, preferably at least one left side 343, preferably at least one right side 344, preferably at least one back side 345 and preferably at least one bottom side 346, as shown.

Housing 340 preferably comprises injection molded plastic. Upon reading this specification, those with ordinary skill in the art will now appreciate that, under appropriate circumstances, considering such issues as design preference, user preferences, cost, structural requirements, available materials, technological advances, etc., other materials such as, for example, metal, spring stell, epoxy resins, fiberglass, aluminum, hard rubbers, etc., may suffice.

Slit cut attachment mechanism 360 preferably comprises at least two thumb screws 364 and 366, as shown. Slit cut attachment mechanism 360 preferably further comprises exactly one slit 361 preferably extending longitudinally across bottom side 346 of housing 340 and preferably perforating left side 343 and preferably perforating right side 344 of housing 340, as shown (at least herein embodying wherein such at least one attacher comprises such at least one slit). Slit 361 preferably comprises exactly one concave surface 362 and preferably exactly one convex surface 363, as shown in FIG. 8. Concave surface 362 and convex surface 363 preferably comprise substantially the same curvature, as shown. The curvature of concave surface 362 and convex surface 363 of slit 161 preferably are substantially equal to the curvature 506 of ruled tape 503. This arrangement preferably enables slit 161 to grip ruled tape 503 (this arrangement at least herein embodying wherein such at least one housing, comprises at least one slit structured and arranged to grip the at least one ruled measure; and this arrangement at least herein embodying wherein such at least one projector comprises at least one slit structured and arranged to grip the at least one linear measuring instrument; and this arrangement at least herein embodying wherein such at least one attacher comprises at least one grip to grip the at least one ruled measure).

Thumb screws 364 and 366 preferably are threaded such that each clockwise turn of screws 364 and 366 advances their screw tips further into slit 361. Upon reading this specification, those with ordinary skill in the art will now appreciate that, under appropriate circumstances, considering such issues as design preference, user preferences, marketing preferences, cost, structural requirements, available materials, technological advances, etc., other tightening arrangements such as, for example, other friction tightening, other screw thread arrangements, etc., may suffice.

When movably connected to ruled tape 503 of measuring device 501, slit cut attachment mechanism 360 preferably constrains ruled tape 503 from all rotational movement relative to slit cut attachment mechanism 360 and preferably only permits translational movement relative to slit cut attachment mechanism 560 along a single axis of movement 523 (see FIG. 9).

In use, a preferred method of movably connecting slit cut attachment device 300 to ruled tape 503 preferably comprises the steps of: inserting ruled tape 503 into slit 361 of housing 340 such that curvature 506 of ruled tape 503 is aligned with the curvatures of concave surface 362 and convex surface 363; extending ruled tape 503 through right side 344 between concave surface 362 and convex surface 363 such that ruled tape 503 exits through left side 343; and rotating thumb screws 364 and 366 clockwise until convex surface of ruled tape 503 is gently pressed flush against convex surface 363.

Figure 10:
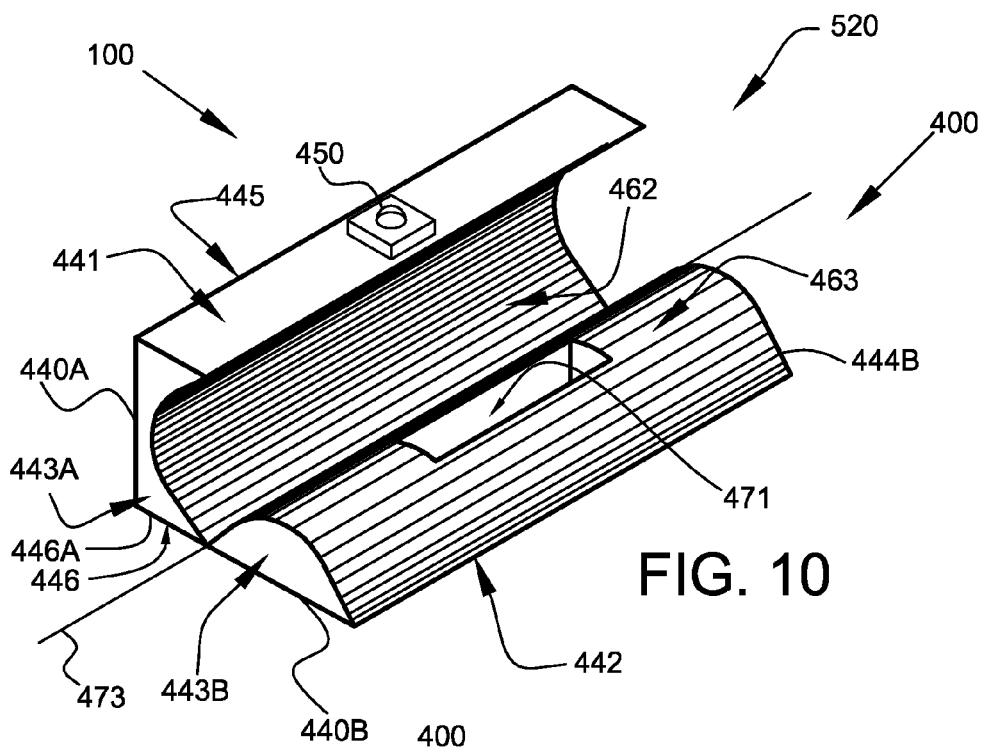
FIG. 10 shows an isometric view of an open box attachment device, illustrating the locating device, according to another preferred embodiment of the present invention.
Figure 11:
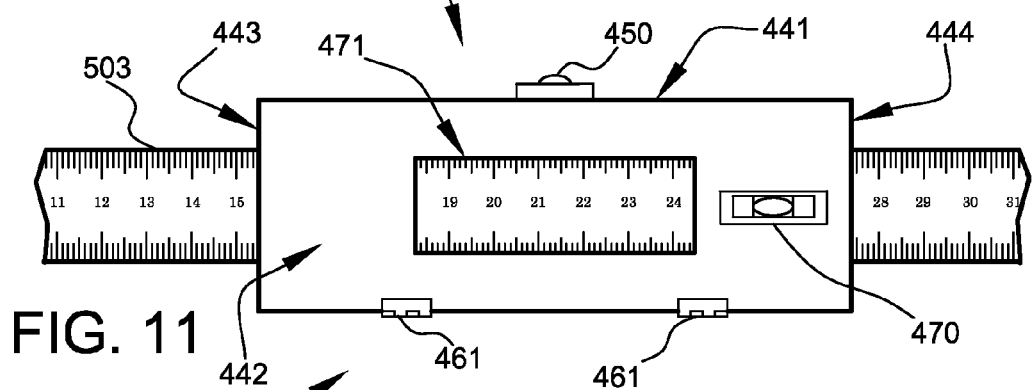
FIG. 11 shows a front view of an open box attachment device with ruled tape visible through an alignment window, thereby illustrating the use of an alignment window, according to the preferred embodiment of FIG. 10.
Figure 12:
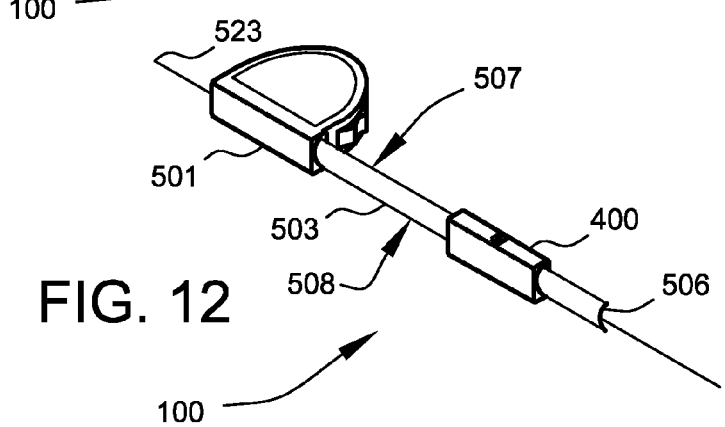
FIG. 12 shows a perspective view, illustrating the connection of the open box attachment device to ruled tape, according to the preferred embodiment of FIG. 10.

FIG. 10 shows an isometric view of open box attachment device 400, illustrating another preferred embodiment of locating device 520 of locating system 100. FIG. 11 shows a front view of open box attachment device 400 with ruled tape 503 visible through alignment window 471, thereby illustrating the use of alignment window 471. FIG. 12 shows a perspective view, illustrating the connection of open box attachment device 400 to ruled tape 503, according to the preferred embodiment of FIG. 10.

Open box attachment device 400 preferably comprises at least two housings 440A and 440B, preferably at least one joint mechanism 461, preferably at least one focused light source 450 (preferably a laser), preferably at least two attachment surfaces, concave surface 462 and convex surface 463, preferably at least one alignment window 471, and preferably at least one leveling device 470, as shown.

Housing 440A preferably comprises at least one top side 441, preferably at least one bottom side 446, preferably at least one left side 443A, preferably at least one right side 444, preferably at least one back side 445, and preferably at least one concave surface 462, as shown. Housing 440B preferably comprises at least one front side 442, preferably at least one left side 443B, preferably at least one right side 444B, preferably at least one convex surface 463, and preferably at least one alignment window 471, as shown. Housing 440A preferably is movably connected to housing 440B by preferably at least one joint mechanism 461 (best viewed in FIG. 11). Joint mechanism 461 preferably comprises a hinge that movably connects bottom side 446A to front side 442 preferably such that housing 440A may freely rotate relative to housing 440B preferably about exactly one longitudinal axis 473 (at least herein embodying wherein such at least one housing comprises at least one first structure, at least one second structure, at least one horizontal axis of rotation between such at least one first structure and such at least one second structure). Joint mechanism 461 preferably is connected to bottom side 446A and preferably to front side 442 preferably in such a manner that housing 440A and housing 440B may close together preferably along concave surface 462 and convex surface 463 preferably thereby temporarily forming a single housing.

Concave surface 462 preferably comprises exactly one concave surface. Preferably, the curvature of concave surface 462 is substantially equal to curvature 506 (see FIG. 12) of ruled tape 503. Convex surface 463 preferably comprises preferably exactly one convex surface.

Preferably, the curvature of convex surface 463 is substantially equal to the curvature 506 of ruled tape 503 (this arrangement at least herein embodying wherein, when such at least one concave surface is rotated to be adjacent to such at least one convex surface at least one grip, structured and arranged to grip the at least one ruled measure, is formed). When movably connected to ruled tape 503 of measuring device 501, concave surface 462 and convex surface 463 preferably cooperate to constrain ruled tape 503 from all rotational movement relative to concave surface 462 and convex surface 463 and preferably only permits translational movement relative to concave surface 462 and convex surface 463 along a single axis of movement 523, as shown. Preferably, axis of movement 523 is parallel to longitudinal axis 473.

Alignment window 471 preferably is an aperture extending through housing 440B that preferably perforates front side 442 and preferably perforates convex surface 463. Alignment window 471 preferably is sufficiently large for a user of open box attachment device 400 to view and read the length markings on ruled tape 503. Alignment window 471 preferably is sufficiently near focused light source 450 such that at least one marked length on ruled tape 503 corresponding to the position of focused light source 450 is viewable through alignment window 471 (at least herein embodying wherein such at least one convex surface of such at least one second structure comprises at least one alignment window structured and arranged to permit user viewing of the at least one ruled measure).

In use, a preferred method of movably connecting open box attachment device 400 to ruled tape 503 preferably comprises the steps of: rotating housing 440A relative to housing 440B such that they are in a substantially open position; placing ruled tape 503 between concave surface 462 and convex surface 463 such that curvature 506 of ruled tape 503 is aligned with the curvatures of concave surface 462 and convex surface 463; rotating housing 440A relative to housing 440B such that they are in a closed position with ruled tape 503 flush against concave surface 462 and convex surface 463.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A portable locating system comprising:
    a) at least one vertical beam projector structured and arranged to project at least one vertical beam comprising parallel light rays;
    b) at least one housing structured and arranged to house said at least one vertical-beam projector; and
    c) at least one attacher structured and arranged to removably attach said at least one housing to at least one ruled measure;
    d) wherein when said at least one vertical beam projector is attached to such at least one ruled measure and such at least one ruled measure is in a substantially horizontal position, such at least one vertical beam may be projected vertically.

2. The portable locating system according to claim 1 wherein:
    a) said at least one housing comprises at least one horizontal groove and at least one flange on at least one side of said at least one horizontal groove; and b) said at least one attacher comprises said at least one horizontal groove and said at least one flange on such at least one side of said at least one horizontal groove.

3. The portable locating system according to claim 1 wherein said at least one attacher comprises at least one grip to grip the at least one ruled measure.

4. The portable locating system according to claim 3 wherein said at least one grip comprises at least one clip.

5. The portable locating system according to claim 1 wherein:
   a) said at least one housing, comprises at least one slit structured and arranged to grip the at least one ruled measure; and
   b) said at least one attacher comprises said at least one slit.

6. The portable locating system according to claim 1 wherein:
   a) said at least one housing comprises
      i) at least one first structure,
      ii) at least one second structure, and
      iii) at least one horizontal axis of rotation between said at least one first structure and said at least one second structure;
   b) said at least one attacher comprises
      i) at least one concave surface of said at least one first structure, and
      ii) at least one convex surface of said at least one second structure; and
   c) when said at least one concave surface is rotated to be adjacent to said at least one convex surface at least one grip, structured and arranged to grip the at least one ruled measure, is formed.

7. The portable locating system according to claim 6 wherein said at least one convex surface of said at least one second structure comprises at least one alignment window structured and arranged to permit user viewing of such at least one ruled measure.

8. The portable locating system according to claim 1 wherein said at least one housing comprises at least one leveler structured and arranged to assist user-leveling of said at least one housing.

9. A method, relating to locating at least one remote point on at least one structure, comprising the steps of:
   a) movably connecting at least one focused light beam locating device to exactly one rule measuring device comprising exactly one flexible ruled portion;
   b) locating such rule measuring device at a first visible point of reference;
   c) extending the flexible ruled portion of said rule measuring device until its leading edge physically contacts at least one second visible point of reference;
   d) locating on the flexible ruled portion at least one user-selected length marker;
   e) sliding said focused light beam locating device along the flexible ruled portion until it is located at said user-selected length marker; and
   f) activating said focused light beam locating device to emit at least one focused light beam in a direction perpendicular to said flexible ruled portion;
   g) wherein user-noting of at least one intersection of such at least one focused light beam and the at least one structure assists such user in locating at least one remote point on the at least one structure.

10. A portable locating system comprising:
    a) at least one projector structured and arranged to project at least one virtual plumb line;
    b) wherein said at least one projector is releasably connectable to at least one linear measuring instrument; and
    c) wherein a user is enabled to project such virtual plumb line at a user-selected location along such at least one linear measuring instrument.

11. The portable locating system according to claim 10:
    a) wherein said at least one projector comprises at least one horizontal groove and at least one flange on at least one side of said at least one horizontal groove; and
    b) wherein said at least one horizontal groove and said at least one flange are structured and arranged to releasably connect to such at least one linear measuring instrument.

12. The portable locating system of claim 10 wherein said at least one projector comprises at least one gripper to grip the at least one linear measuring instrument.

13. The portable locating system of claim 12 wherein said at least one gripper comprises at least one clip.

14. The locating system of claim 10 wherein said at least one projector comprises at least one slit structured and arranged to grip the at least one linear measuring instrument.

15. The portable locating system of claim 10:
    a) said at least one housing comprises
       i) at least one first structure,
       ii) at least one second structure, and
       iii) at least one horizontal axis of rotation between said at least one first structure and said at least one second structure;
    b) said at least one attacher comprises
       i) at least one concave surface of said at least one first structure, and
       ii) at least one convex surface of said at least one second structure; and
    c) when said at least one concave surface is rotated to be adjacent to said at least one convex surface at least one grip, structured and arranged to grip the at least one linear measuring instrument, is formed.

16. The portable locating system of claim 15 wherein said at least one convex surface of said at least one second structure comprises at least one alignment window structured and arranged to permit user-viewing of the at least one linear measuring instrument.

17. The portable locating system of claim 10 wherein said at least one housing comprises at least one leveler structured and arranged to assist in leveling said at least one housing.

18. A portable locating system comprising:
    a) at least one projector structured and arranged to project at least one image; and
    b) at least one housing structured and arranged to house said at least one projector;
    c) wherein said at least one housing comprises at least one gripper structured and arranged to releasably grip at least one linear measurer; and
    d) wherein said at least one housing, said at least one gripper and said at least one projector comprise at least one geometry structured and arranged so that said at least one projector projects perpendicular to at least one line of measure of such at least one linear measurer.

19. A portable locating system comprising:
    a) vertical-beam projector means for projecting at least one vertical-beam comprising parallel light rays;
    b) housing means for housing said vertical-beam projector means; and
    c) at least one attacher means for removably attaching said housing to at least one ruled measure;
    d) wherein, when said vertical-beam projector means is attached to the at least one ruled measure and the at least one ruled measure is in a substantially horizontal position, the at least one beam may be projected vertically.

20. The portable locating system according to claim 19 wherein said vertical-beam projector means comprises laser means for laser beam light projection.

* * * * *